March 3, 1942.   W. T. MURDEN   2,275,307

BEARING SEAL

Filed March 8, 1939

INVENTOR:
WILLIAM T. MURDEN,
BY
HIS ATTORNEY.

UNITED STATES PATENT OFFICE 2,275,307

BEARING SEAL

William T. Murden, Bristol, Conn., assignor to General Motors Corporation, Detroit, Mich., a corporation of Delaware Application March 8, 1939, Serial No. 260,566

6 Claims. (Cl. 286—11)

This invention relates to bearings and particularly to bearing seals so devised that a lubricant is permanently sealed against loss from within the bearing, and the ingress of water and other deleterious substances is prevented from entrance into the bearing.

An object is to provide an improved seal that has relatively rotatable elements in yieldable side-wiping sealing contact, and another object is to provide a simply constructed and easily assembled seal in unit-handling relation with an antifriction bearing and which will maintain a highly effective sealing relation even under conditions of misalignment of the bearing parts. A further object resides in the provision of such a seal which will throw water and other deleterious substances away from the zone of sealing contact during the bearing rotation.

To these ends and also to improve generally upon devices of the character indicated, the invention consists in the various matters hereinafter described and claimed.

Figure 1:
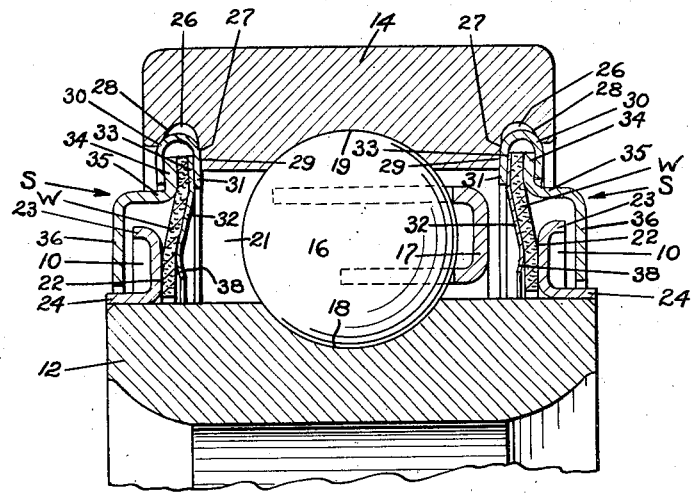
Figure 2:
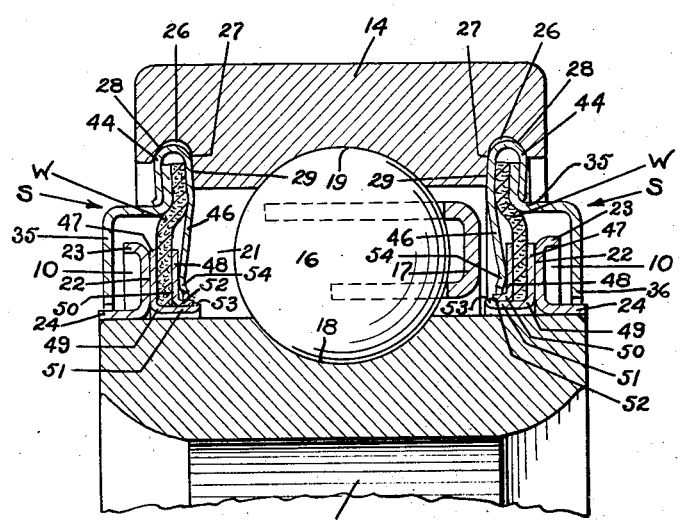

In the accompanying drawing:

Figure 1 is a fragmentary axial section of a ball bearing equipped with one embodiment of my seal; and Figure 2 is a fragmentary axial section showing another form of my seal in unit handling relation with a ball bearing.

Generally stated, each of my sealing devices, S, includes an annular slinger 10 sealingly secured to a rotatable member, as the inner race ring 12 of an antifriction bearing (herein shown as a unit-handling ball bearing) provided with a non-rotatable member, such as the outer race ring 14, and the bearing balls 16, guided by the cage 17, roll in the raceways 18 and 19 respectively formed in the race rings 12 and 14. A flexible sealing washer W, which is supported by the member 14, is deformed into yieldable lateral sealing relation with the annular side slinger face 22. The slinger 10 also extends outwardly beyond the sealing portion of the washer W, and, due to the centrifugal forces of rotation, deleterious substances are thrown away from the sealing zone, while the yieldable sealing relation of the washer W with the slinger 10 is always sufficient to maintain a highly effective seal which will permanently hold a suitable lubricant within the bearing even in the event that the relatively rotatable seal-supporting members should become located out of their normal coaxial relation.

Referring now to the drawing, in the embodiment of Figure 1 the slingers 10, which are preferably made from sheet metal rings bent to shape and respectively mounted in opposed relation at the ends of the bearing, are each provided with a mounting flange 24 pressed in tightly sealing engagement over the outer ends of the inner race rings 12 that project beyond the ends of the outer race ring 14. The slingers 10 are provided with the seal engaging faces 22, which are preferably radially disposed outwardly and are substantially flat, and the flexible sealing washers W are respectively pressed against these faces 22 in side-wiping sealing contact so that lubricant is permanently maintained in the lubricant chamber 21. The faces 22, which extend beyond and outside of the sealing zone, provide slinger portions outside of the lubricant chamber that terminate in the reinforcing rims 23, and water and other deleterious substances are thrown away from the sealing zone by the centrifugal forces of the slinger rotation.

The outer race ring 14 has near its ends the internal peripheral grooves 26 each of which has the divergent side walls 27 and 28, the inner wall 27 forming part of a deep shoulder 29. An annular holder 30, substantially U-shaped in cross section and preferably formed from sheet metal, has a rear wall 31 fitted against the shoulder 29, and this holder 30 is wedged between the divergent side walls of the groove in non-bottoming sealing relation in the same general manner as disclosed in the United States patent to Murden, Number 2,140,091 and issued on December 13, 1938. The flexible washers W are each preferably laterally and conically deformed into yieldable side-wiping sealing contact with the respective slinger faces 22 by a dished spring disc 32, and the outer peripheral portions of the washers W are each sealingly clamped between a flange 33 on the disc 32 and a flange 34 on a stepped annular shield 35 by clamping the sides of the holders 30 against these flanges 33 and 34. The shield 35 has an outer wall 36 that overlies the slinger 10 in spaced relation and protects the sealing members. The inner edge 38 of the disc 32 is curled back away from the washer W to facilitate a smooth sealing contact of the washer and to prevent the edge 38 from cutting the washer. This disc 32 resiliently urges the washer W into sufficiently tight sealing relation to prevent leakage from the lubricant chamber 21 in the event that the race rings should become located out of their normal coaxial relation.

Figure 2 shows another embodiment of my seal, S, in unit-handling relation with a ball bearing similar to that shown in Figure 1. In this construction the holder 44, which is generally similar to the holder 30 and which is wedged in non-bottoming sealing engagement in the groove 26 in the same manner, has an annular dished resilient rear wall 46 that serves the same purpose as the spring disc 32. The inner periphery of the sealing washer W is clamped between the annular side walls 47 and 48 of a pair of interfitting rings 49 and 50 carried by the washer W in spaced relation about the inner race ring 12. These rings, each of which are substantially L-shaped in cross section, are respectively provided with the coaxial slidably interfitting flanges 51 and 52 which are secured in position by a curled over edge 53 of the outer flange 51 bent into overlying relation with the edge of the inner flange 52. The side wall 47 of the outer ring 49 lies in smoothly slidable sealing relation with the parallel abutting face 22 of the slinger 10, and the spring wall 46 has a rounded inner edge 54 resiliently engaged with sufficiently yieldable pressure against the side wall 48 of the inner ring 50 to maintain this sealing relation. In the event that the race rings should become located out of their normal coaxial relation, the intermediate unsupported portion of the washer W will freely flex so that the sealing relation may be easily maintained. A stepped shield 35 is clamped in position in the same manner as shown in Figure 1 and has a protecting wall 36 overlying the sealing washer W and the slinger 10.

Although each of the illustrated constructions is particularly adapted to have the inner race ring 12 serve as a rotatable bearing member, it has been found that my seal will be equally effective if the inner race ring is held stationary and the outer race ring 14 constitutes the rotatable bearing member, in which event the sealing washer W will act as a slinger that throws deleterious substances away from the sealing zone.

I claim:

1. In a device of the character indicated, a pair of relatively rotatable members having an annular lubricant chamber therebetween, a pair of annular sealing elements in side wiping sealing relation and co-operatively closing one end of said chamber, a holder mounted on one of said members and peripherally supporting one of said elements, an annular backing spring peripherally carried by the holder and yieldably urging said elements into sealing relation, an annular shield peripherally mounted in the holder and located outside of the lubricant chamber, holder means laterally clamping the shield and said backing spring respectively against opposite sides of the holder-supported sealing element adjacent its periphery, and said other element being mounted on said other member and having a slinger portion between said shield and said holder-supported sealing element.

2. In a device of the character indicated, a pair of relatively rotatable members having an annular lubricant chamber therebetween, one of said members having a peripheral groove directed into an end of the chamber, sealing elements respectively carried by said members and cooperatively closing the chamber adjacent said groove, an annular holder wedged in non-bottoming sealing engagement in the groove, one of the elements being flexible and peripherally supported in the holder, means carried by the holder and deflecting the flexible member into sealing relation with the other element, a shield peripherally supported by the holder and overlying the elements outside of said chamber, and a slinger portion on one of the elements between the shield and the other element; substantially as described.

3. In a device of the character indicated, a pair of relatively rotatable members having an annular lubricant chamber therebetween, an annular holder sealingly secured to one of said members, annular overlapping sealing elements respectively and peripherally mounted in the holder and on said other member, the element in the holder being flexible, interlocked wear-resistant rings clamped over an edge of the flexible element, a backing spring carried by the holder and laterally deforming the flexible element to yieldably locate one of said rings in lateral sealing contact with the other element, a slinger portion on said other element outside of said chamber, and a shield peripherally supported by the holder and overlying the elements in spaced relation outside of said chamber; substantially as described.

4. In a device of the character indicated, a pair of relatively rotatable members having an annular lubricant chamber therebetween, an annular holder mounted on one of said members, an annular sealing element mounted in the holder and extending towards said other member at one end of said chamber, an annular shield peripherally mounted in said holder against said sealing element and located outside of the lubricant chamber, a slinger carried by said other member and axially located between the shield and said sealing element, and means holding the sealing element and said slinger in sealing contact.

5. In a device of the character indicated, a pair of relatively rotatable members having an annular lubricant chamber therebetween, an annular holder mounted on one of said members, an annular sealing element mounted in the holder at one end of the lubricant chamber, a shield peripherally mounted in the holder against the sealing element and having an annular wall outside of the lubricant chamber, said wall extending towards said other member in lateral spaced relation to said sealing element, a slinger carried by said other member and axially located between said wall and the sealing element, and means carried by the holder for urging the sealing element into side-wiping sealing engagement with said slinger.

6. In a device of the character indicated, a pair of relatively rotatable members having an annular lubricant chamber therebetween, an annular holder mounted on one of said members, a flexible sealing washer clamped within said holder at one end of the lubricant chamber, a shield outside of said lubricant chamber and perpiherally clamped in said holder against said sealing washer, an annular wall on the shield directed towards said other member in lateral spaced relation to said washer, an annular slinger mounted on said other member and axially located between said wall and said washer, and the holder having an annular resilient portion for laterally deforming the washer into side-wiping yieldable sealing engagement with the slinger.

WILLIAM T. MURDEN.